(12) United States Patent
Kempf

(10) Patent No.: US 9,728,943 B2
(45) Date of Patent: Aug. 8, 2017

(54) CABLE SLIDER WITH SYMMETRIC PIECES

(71) Applicant: Production Resource Group LLC, New Windsor, NY (US)

(72) Inventor: James Kempf, New Windsor, NY (US)

(73) Assignee: Production Resource Group, LLC, New Windsor, NY (US)

( * ) Notice: Subject to any disclaimer, the term of this patent is extended or adjusted under 35 U.S.C. 154(b) by 0 days.

(21) Appl. No.: 15/130,177

(22) Filed: Apr. 15, 2016

(65) Prior Publication Data

US 2016/0344171 A1 Nov. 24, 2016

Related U.S. Application Data

(63) Continuation of application No. 14/457,330, filed on Aug. 12, 2014, now abandoned, which is a continuation of application No. 13/209,643, filed on Aug. 15, 2011, now Pat. No. 8,801,324.

(60) Provisional application No. 61/374,553, filed on Aug. 17, 2010.

(51) Int. Cl.
| | |
|---|---|
| *H02G 1/06* | (2006.01) |
| *H02G 3/30* | (2006.01) |
| *H02G 11/00* | (2006.01) |
| *F16G 11/00* | (2006.01) |
| *F16G 15/04* | (2006.01) |
| *F16G 15/06* | (2006.01) |

(52) U.S. Cl.
CPC ............ *H02G 1/06* (2013.01); *F16G 11/00* (2013.01); *F16G 15/04* (2013.01); *F16G 15/06* (2013.01); *H02G 3/30* (2013.01); *H02G 11/00* (2013.01); *Y10T 24/39* (2015.01); *Y10T 24/3902* (2015.01); *Y10T 24/45267* (2015.01); *Y10T 29/4984* (2015.01); *Y10T 403/61* (2015.01); *Y10T 403/65* (2015.01); *Y10T 403/655* (2015.01); *Y10T 403/7094* (2015.01); *Y10T 403/7152* (2015.01)

(58) Field of Classification Search
CPC .... F16L 3/00; F16L 3/14; F16G 15/00; F16G 15/04; F16G 15/06; F16G 11/00; H02G 1/06; Y10T 24/29; Y10T 24/3902; Y10T 24/45267; Y10T 403/61; Y10T 403/65; Y10T 403/655; Y10T 403/7094
USPC ........ 403/339, 340, 331, 381, 393; 248/693; 24/116 R
See application file for complete search history.

(56) References Cited

U.S. PATENT DOCUMENTS

| | | | | |
|---|---|---|---|---|
| 1,427,848 | A * | 9/1922 | Rankin | B60C 27/08 24/592.11 |
| 1,837,787 | A * | 12/1931 | Josef | E02D 5/08 29/897.3 |
| 3,350,752 | A * | 11/1967 | Plummer | B29C 65/56 24/584.1 |
| 3,790,993 | A * | 2/1974 | Gilles | A44B 19/16 24/399 |
| 4,621,393 | A * | 11/1986 | Ambal | A44B 11/266 24/171 |

(Continued)

*Primary Examiner* — Joshua J Michener
*Assistant Examiner* — Alp Akbasli
(74) *Attorney, Agent, or Firm* — Law Office of Scott C Harris, Inc

(57) ABSTRACT

A device which can slide up and down on a chain or cable, can be loosened to attach to the chain or cable, but does not have any parts that come free when the part is loosened. The device includes first and second pieces, each made of structural material, the first and second pieces fitting together at concave and convex surfaces, to form an interlock forms inner surfaces with a through hole of a first shape that can slide along either a cable or a chain.

7 Claims, 6 Drawing Sheets

(56) References Cited

U.S. PATENT DOCUMENTS

| | | | | |
|---|---|---|---|---|
| 4,922,586 A * | 5/1990 | Robson | | A44B 19/16 24/389 |
| 5,044,583 A * | 9/1991 | Daigle | | F16L 3/00 248/62 |
| 5,261,257 A * | 11/1993 | Collier | | A44B 15/002 24/576.1 |
| 5,653,411 A * | 8/1997 | Picco | | F16L 3/2235 24/339 |
| 5,735,024 A * | 4/1998 | Ortiz | | A44B 11/266 24/573.11 |
| 6,915,870 B2 * | 7/2005 | Sugiyama | | B60R 16/06 180/69.4 |
| 7,610,783 B2 * | 11/2009 | Rudduck | | B62D 27/00 24/602 |
| 7,636,986 B2 * | 12/2009 | Sorensen | | B60P 7/0823 24/129 A |
| 7,857,551 B2 * | 12/2010 | Heindl | | E02D 5/08 405/279 |
| 8,801,324 B2 * | 8/2014 | Kempf | | H02G 1/06 403/331 |
| 2003/0089829 A1 * | 5/2003 | Brandzel | | F16L 3/222 248/68.1 |
| 2007/0077127 A1 * | 4/2007 | Berlin | | E02B 3/06 405/220 |
| 2007/0138353 A1 * | 6/2007 | Guthke | | H02G 3/30 248/75 |
| 2007/0246616 A1 * | 10/2007 | Budagher | | F16L 3/11 248/68.1 |
| 2008/0145154 A1 * | 6/2008 | Heindl | | E02D 5/08 405/279 |
| 2008/0175674 A1 * | 7/2008 | Heindl | | E02D 5/08 405/278 |
| 2010/0031479 A1 * | 2/2010 | Apicella | | A62B 1/14 24/129 R |
| 2011/0114802 A1 * | 5/2011 | Hjerpe | | F16L 3/222 248/68.1 |
| 2012/0036684 A1 * | 2/2012 | Tilman | | B65D 33/2541 24/399 |

* cited by examiner

CABLE SLIDER WITH SYMMETRIC PIECES

This is a continuation of Ser. No. 14/457,330, which is a continuation of Ser. No. 13/209,643, which claims priority from provisional application number 61/374,553, filed Aug. 17, 2010, the entire contents of which are herewith incorporated by reference.

This application is a continuation of Ser. No. 13/209,643 filed Aug. 15, 2011, now U.S. Pat. No. 8,801,324, issued Aug. 12, 2014.

BACKGROUND

For concert tours, industrial shows, and Broadway shows, it has become common to festoon electrical cables vertically up tensioned moving chain hoist chains and winch wire ropes.

Existing plastic chain/cable sliders are two piece units joined with multiple fasteners and requiring tools for installation or removal. This can be cumbersome since these existing chain sliders are often changed out by stagehands while they are installed high up on trusses, lifts, or ladders where loose tools and parts are a hazard.

SUMMARY OF THE INVENTION

The new embodiment forms a chain/cable slider that has two matching halves that dovetail together with no tools or loose fasteners.

DETAILED DESCRIPTION

Figure 1:
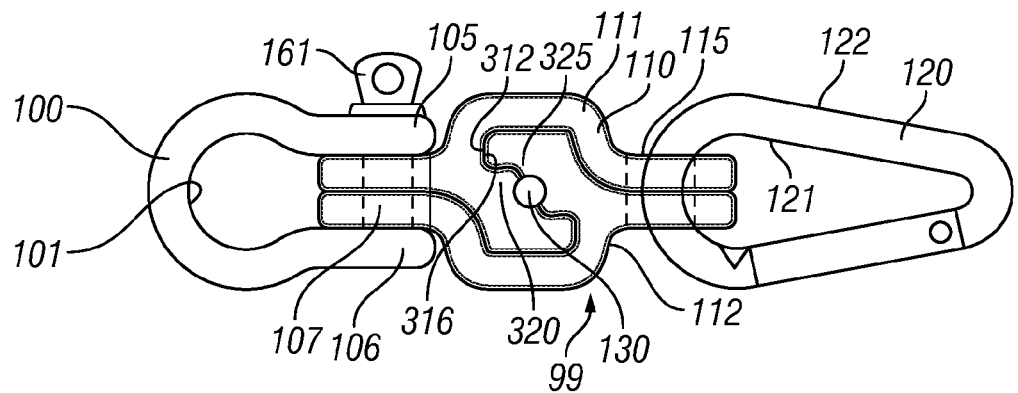
FIG. 1 shows a plan view according to an embodiment of an assembled device according to the present system.

FIG. 1 shows a first embodiment which is a basic embodiment for sliding on a cable. A first device 99 is used in the first embodiment. The device can be formed of a shackle, dogclip and/or carabineer 100, as a first locking device at a first end of the device 99. The first locking device 100 has an inner surface 101 that holds a wire rope or chain that supports the device.

The nonstructural and of locking device 100 forms two spaced apart arms 105, 106 with a central shaft 107 through which a screw 161 is loosened and tightened in a way that locks the arms 105 106 and attaches the arms to the main structural cable piece 110. The other end of the cable piece 110 is also attached to a second carabiner 120. According to an embodiment, the cable piece 110 has a portion of the carabiner fed through openings 115 in the cable piece, so that the carabiner 120 cannot be separated from the cable piece 110 using a screw. In addition, the carabiner 120 can freely pivot in multiple different directions of freedom relative to the cable piece 110 and its outer surfaces 121, 122 can move within the inner surface 115 of the cable piece 110.

The cable piece 110 has a body which is formed of two attached and symmetrical parts 111, 112. Both of the symmetrical parts have a section of a hole therein, so that when the two symmetrical parts are brought together, it forms a through hole 130 through which a cable can slide, but within which the cable is held captive. In different embodiments, the through hole can be different sizes, for example the through hole can be sized for a ⅛ inch or 1/16 inch cable.

Figure 2:
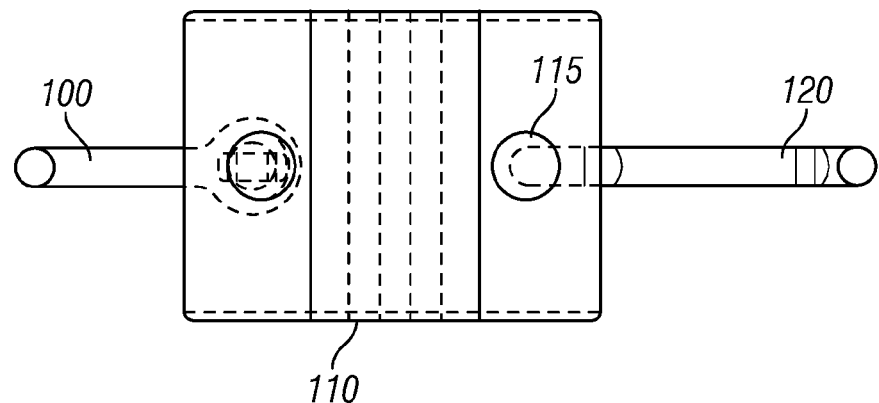
FIG. 2 shows a front view of the device, showing the central portion and the two ends.

FIG. 2 shows a side view showing the different parts including the first locking device 101 and, the second carabiner 120 at the other end, and the body/cable piece 110 in the center.

Figure 3:
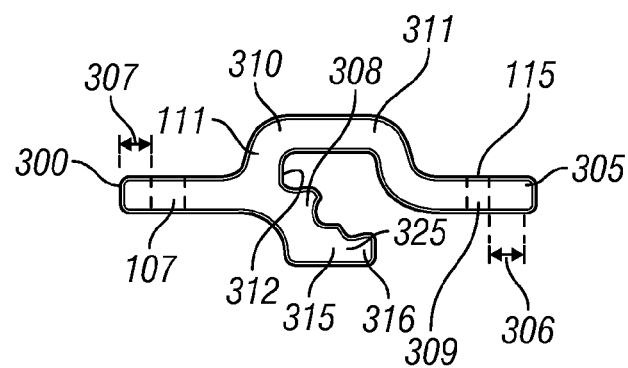
FIG. 3 shows a part making up one of the single sides of two sandwich parts.

FIG. 3 shows a cross-section of the first portion 111 of the cable piece, that couples with another portion 112 of the cable piece. The two portions together form a through hole 130 which allows cable to pass through that hole. The two parts may be exactly the same part and connect together. Each end includes a tip. The first tip 300 includes the through hole 107 therein which receives the screw from the first locking device. The second end 305 also includes a corresponding hole portion 309 which forms the hole 115 shown in FIG. 1. The holes in the two tips may be at symmetrical locations, that is the distance 306 between one end of the hole and the tip may be the same as the distance 307 between one end of the hole 107 and the tip 300.

In addition, this "piece" forming the central portion has a connection area 310 that extends between the first tip and 300 and the second tip and 305. This connection piece is a structural piece that forms the structural connection between the first and second ends. As shown in FIG. 3, this piece juts upward at the central area 311. By jutting upward, it also forms an internal cavity 312. There is also a portion referred to herein as the jutting end 315 that juts down from the first tip end, towards the second tip end but does not reach to the second tip end. This jutting down portion has inner surfaces, the first part of the inner surface forming the cavity portions 312. The tip end of the jutting portion 316 is symmetrical to the shape of the cavity 312, so that if a second portion like the first portion is attached to the first portion, the tip end 316 of the second portion extends into and fits into the cavity 312.

In addition, the portion has convex and concave curved surfaces. For example, there is a convex surface 320 and a concave curved surface 325. FIG. 1 shows how when two of these portions are connected together, the tip end 316 of one of these portions fits into the cavity 312 of the other of the portions. In addition, the convex portion 320 fits into a corresponding concave portion 325 of the other piece and vice versa. In this way, the two pieces are held together, but form the through hole 130.

Because of the structural support in the center when the two pieces are coupled together, one embodiment requires only a structural support between the holes at one end. FIG. 1 shows that there is a bolt holding the portions at 107, but no bolt holding the other portions at the other end 115.

In operation, therefore, the two parts 111 112 can be easily separated by opening the screw 161. This screw 161 may be of a type that does not require any tools for tightening and loosening. The screw is loosened, but remains captive in its location so that no parts can fall. Moreover, loosening the screw preferably only removes the screw from a portion of the opening so that the end 100 remains attached to the body 110, but allows the two parts 111, 112 to separate from one another. In this configuration, the parts can be separated, and the cable can be placed through the through hole 130. The parts can then be reconnected, and the screw retightened. No tools are necessary for this operation, and no parts can come loose from this operation. Accordingly, for example the carabiner 120 can be attached onto a support during the operation, so that no parts can fall while the device 99 is being attached onto the cable.

This embodiment shown in FIGS. 1-3 is a cable slider, where there is a small hole 130 and the cable can only slide through the inner surfaces forming that hole.

Figure 4:
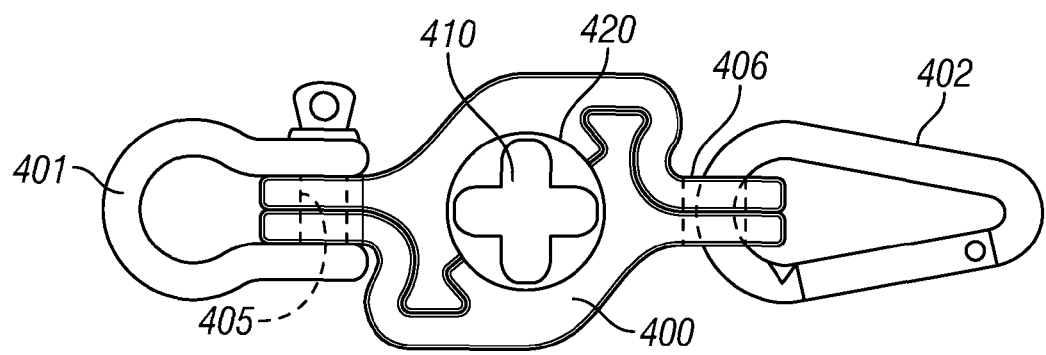
FIGS. 4-6 respectively show plan view, front view and single piece for a second embodiment in which the central portion sized for a chain but allowing the chain to rotate.
Figure 5:
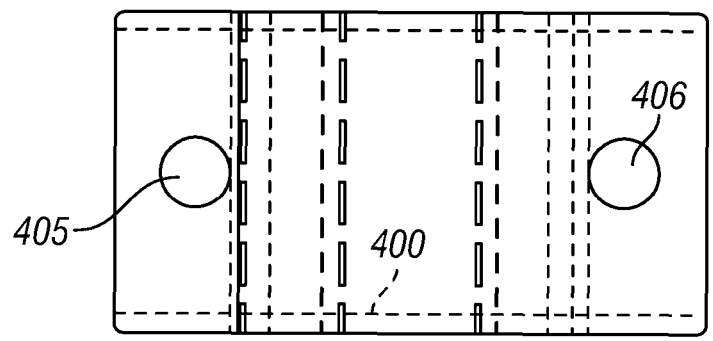
Figure 6:
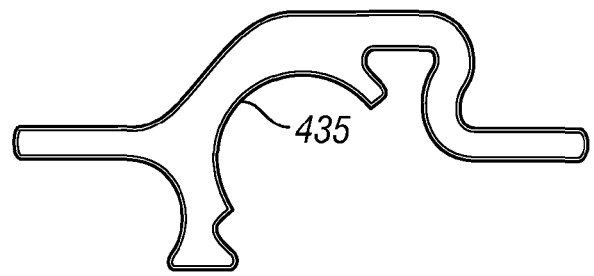

A second embodiment, shown in FIGS. 4-6 shows a chain slider that allows movement along a chain rather than along the cable as in the embodiment of FIG. 1 through 3. In this embodiment, the cable piece 400 includes a circular center hole 420, large enough to hold a chain, shown in cross-section as a plus shape 410. In this embodiment, the device may be controlling for example a chain motor with a lift chain. The chain motor has an electrical connection with an electrical cable. The slider 420 passively slides up and down the chain 410 due to tension/slack on the electrical cable as the chain motor moves.

As in the first embodiment, the chain portion 400 forms a central body which is connected at one end to a fixed portion 401 that connects together with the screw, and is connected at the other end to a freely pivotable portion 402 formed of a carabiner. The part 401 does not pivot, so loads attached at the part 401 cannot cause the part 401 to pivot. Loads attached at the 402 end, however, do cause that end to pivot.

FIG. 5 shows a front view of the device, showing the center portion 400, the hole 405 through which the first end 401 is attached and the hole 406 through which the second end is attached.

As in the first embodiment, FIG. 6 shows how the center portion in the second embodiment is formed from two symmetrical pieces.

Figure 7:
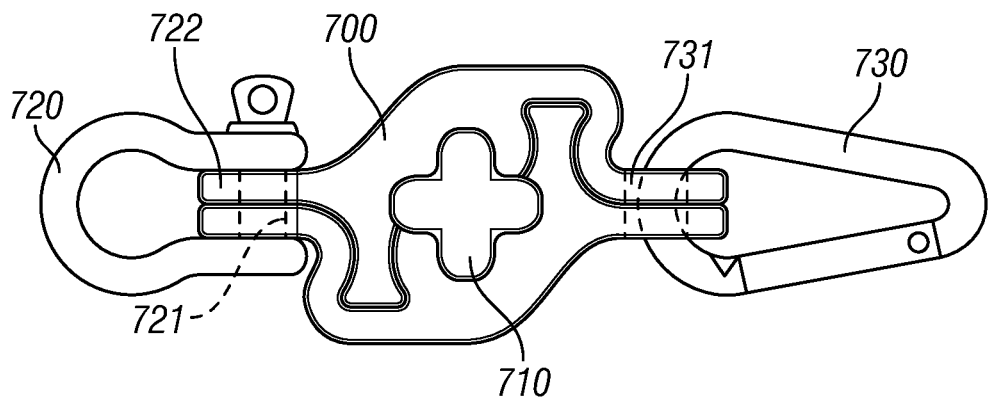
FIGS. 7-9 show another embodiment in which the central portion is sized for a nonrotating chain.
Figure 8:
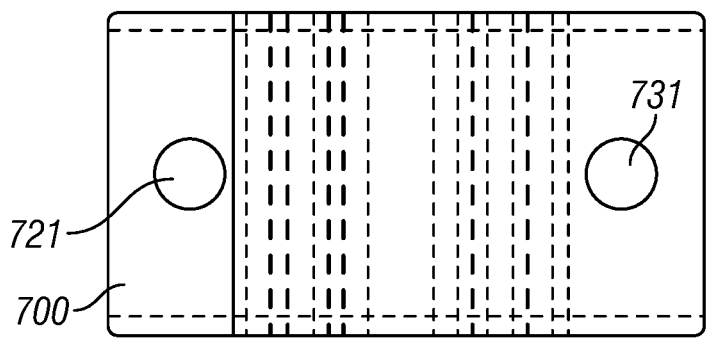
Figure 9:
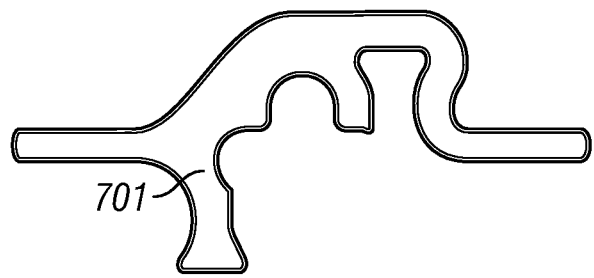

A third embodiment, shown in FIGS. 7-9, is a nonrotating model, which does not allow the chain to rotate. In this embodiment, the center portion 700 has a substantially plus shaped central portion 710 which is captured around the chain end to rotate with the chain; so that if the chain rotates, which is rare, the device also rotates. As in the other embodiments, a first end 720 includes a non-rotatable holder, that is attached through a through hole 721 by a screw 722. The second end includes a rotatable carabiner 730 which is attached through the through hole 731, and can freely rotate in any desired direction. FIG. 8 shows a front view of the center portion 700, showing the holes 721 and 731. As in the other embodiments, the center portion is symmetrical, so that either side can attach to either the fixed portion or the pivotable portion.

FIG. 9 shows a single plate 701 which is a symmetrical plate forming the portions.

Each of these embodiments have the advantage that their center part is formed by two identical parts that are placed against one another. For example, in the embodiment of FIG. 7-9, the two parts are placed against one another. In the FIG. 4-6 embodiment, a round center portion 420 is placed within a round hole formed by the two opposing semi-spherical surfaces 435.

Figure 10:
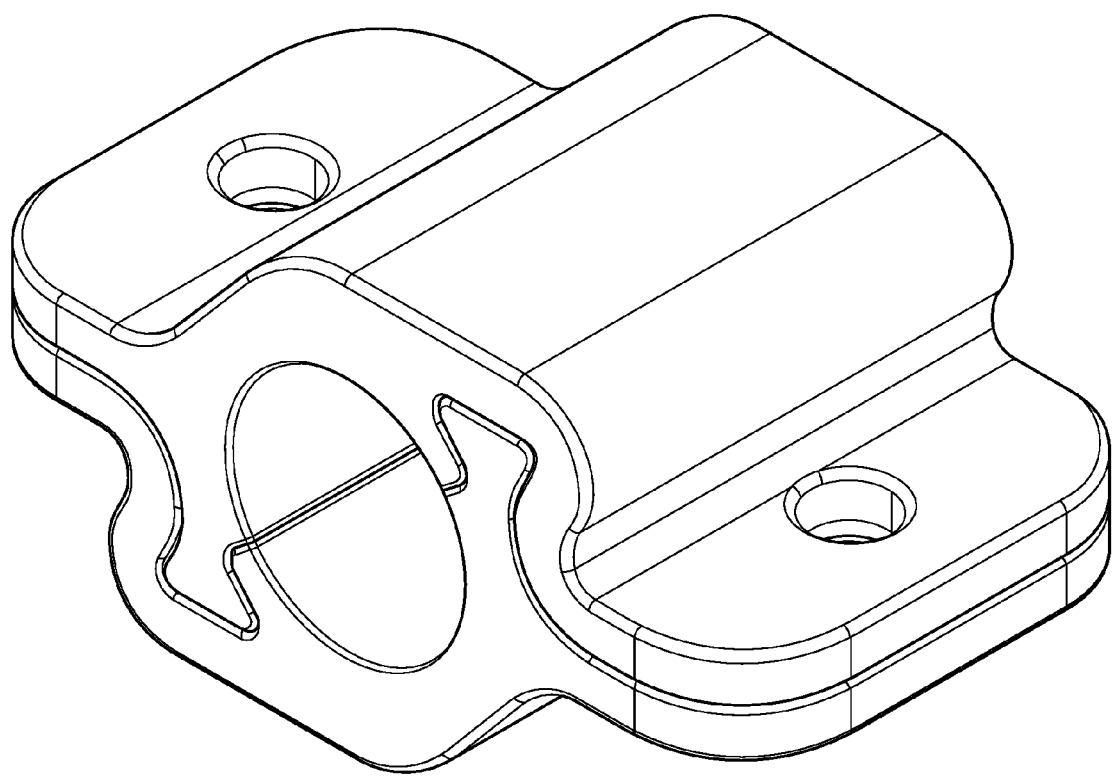
FIG. 10 illustrates a perspective of the FIG. 4 embodiment.

FIG. 10 shows a perspective view of the two parts from FIG. 6 pressed against one another, forming the central hole into which the rotating part can be inserted.

Figure 11:
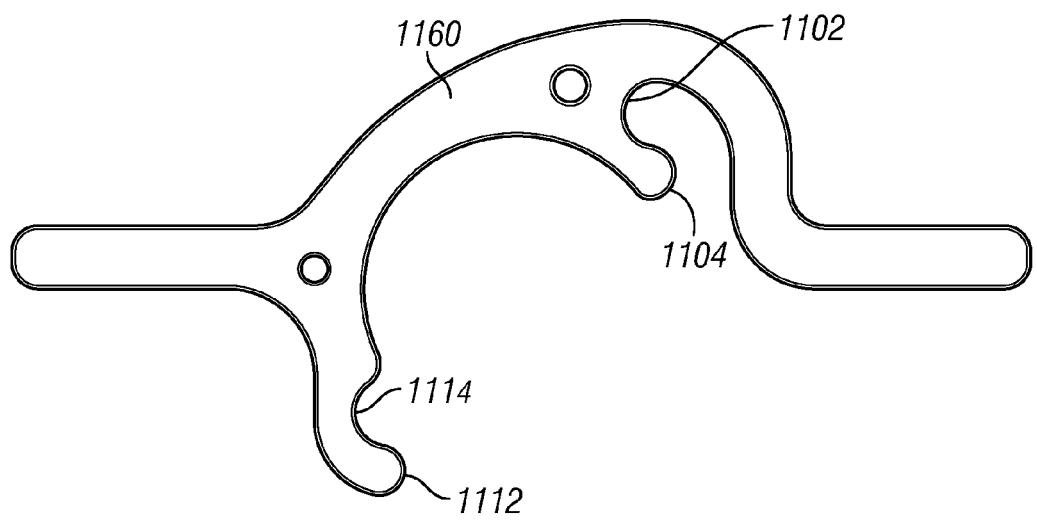
FIGS. 11-13 show an alternative embodiment with the central portion sized for a chain, in which the surfaces are differently shaped.
Figure 12:
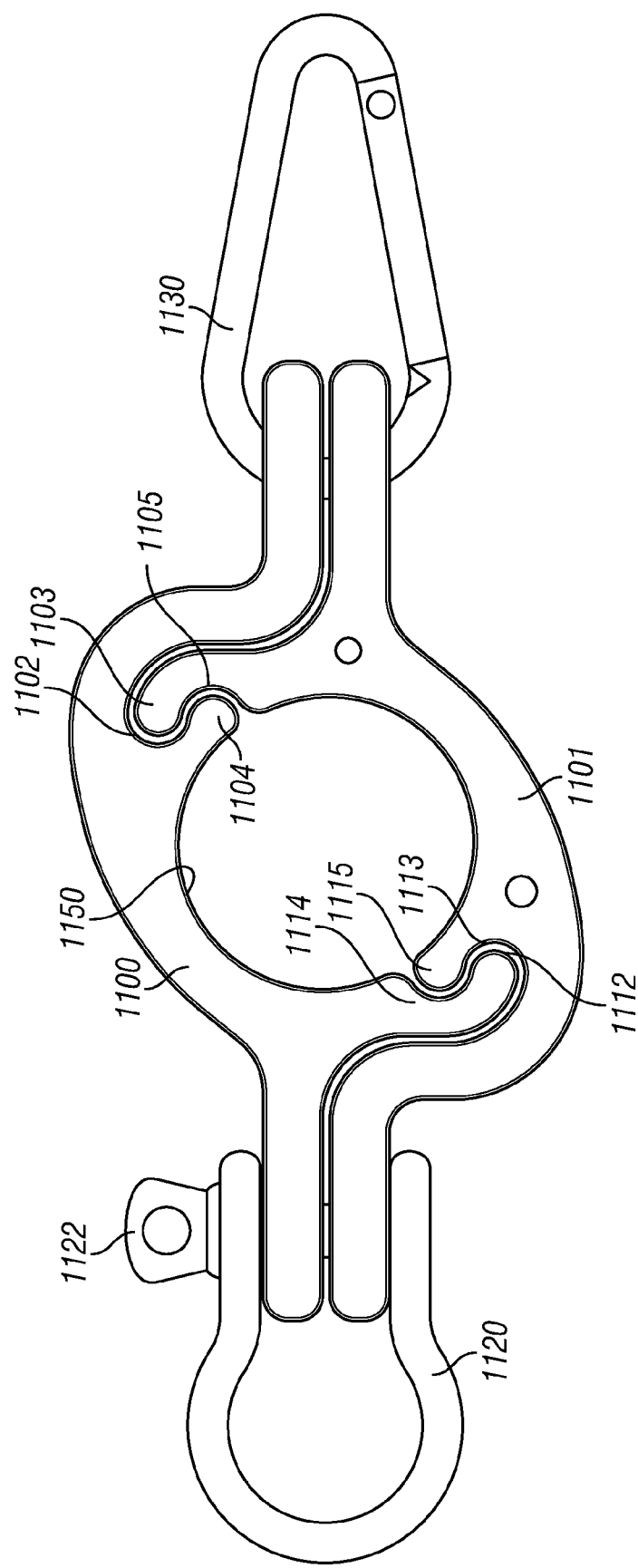
Figure 13:
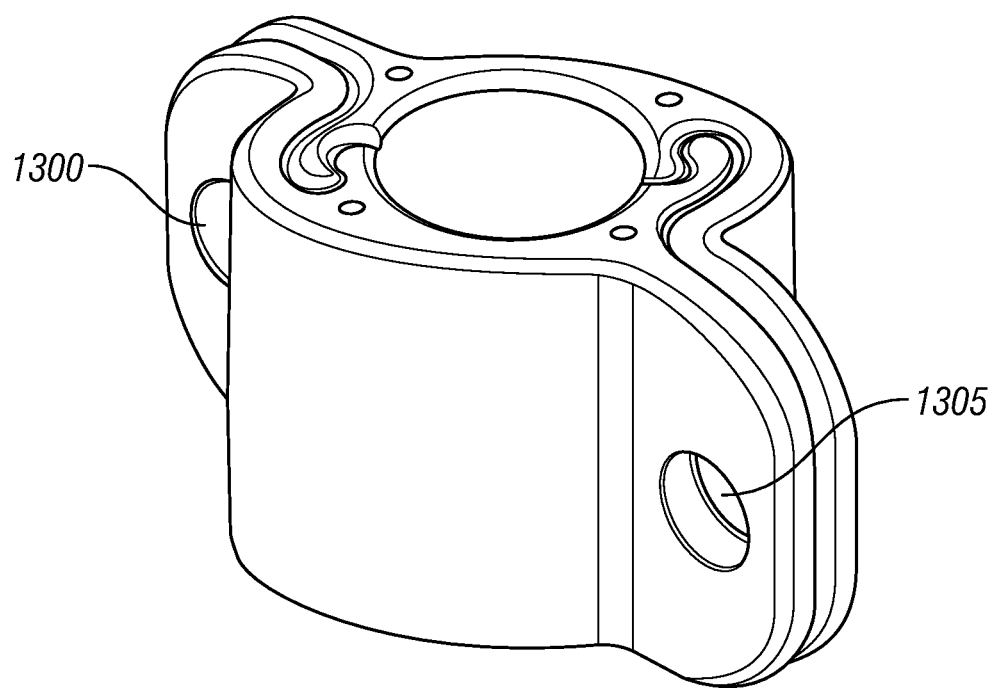

FIGS. 11-13 show an alternative embodiment in which more of the surfaces are curved. The FIG. 11-13 embodiment has a comparable sized inner cavity to that in the FIG. 4-6 embodiment, however it should be understood that this embodiment can also be formed using the shape of FIG. 1-3 or 7-10. FIG. 11 shows the single piece 1100 which forms half of the assembled part. This single piece, like the other embodiments, includes a concave surface 1102, and a convex surface 1104 at the top part of the device, and also includes the convex surface 1112 and concave surface 1114 at the bottom part of the device. FIG. 12 shows two of the basic parts 1100, 1101 connected together. As in the other embodiments, the concave surfaces mate with respective convex surfaces in the assembled device, so the concave surface 1102 mates with the corresponding convex surface 1103 on the part 1101. In a similar way, the convex surface 1104 mates with a corresponding concave surface 1105, part 1101. In a similar way, the convex surface 1112 mates with a corresponding concave surface 1113, and the concave surface 1114 mates with a corresponding convex surface 1115.

As in the other embodiments, this device may include a shackle 1120 that is screwed in via a captive screw 1122 and where the screw remains captive when loosened. When this shackle has been removed or loosened, the parts can slide relative to one another to separate the two parts 1100, 1101, and allow access to the opening 1150. The device may also include a carabiner shown as 1130 at the other end. FIG. 13 shows the fully assembled device, however without the shackle 1120 and carabiner 1130. In this embodiment, the parts include more highly curved surfaces, and this embodiment may provide even better connection than the other embodiments.

In an embodiment, these devices can be machined on a CNC water jet machine, or can be injection molded.

The above has described shackles and carabiner as being placed into the respective holes in the device such as 1300, 1305. However, any connection part or any part of any type whatsoever can be placed through these holes.

Although only a few embodiments have been disclosed in detail above, other embodiments are possible and the inventors intend these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art. For example, other kinds and sizes of chain or cable can be used.

Also, the inventor intends that only those claims which use the words "means for" are intended to be interpreted under 35 USC 112, sixth paragraph. Moreover, no limitations from the specification are intended to be read into any claims, unless those limitations are expressly included in the claims.

Where a specific numerical value is mentioned herein, it should be considered that the value may be increased or decreased by 20%, while still staying within the teachings of the present application, unless some different range is specifically mentioned.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A cable sliding device, comprising:

first and second pieces, each made of structural material, said first piece and said second piece having the same shape, and each having a first end and a second end, said first and second pieces fitting together at an inner surface location, where a first surface of said first piece presses against a second surface of said second piece, and where said first end of said first piece presses against said second end of said second piece, said inner surface location shaped to interlock the first and second pieces together, and where an area of the inner surface location forms inner surfaces forming a plus-shaped area, having a first linearly extending surface shaped to hold a chain link facing in a first orientation, and a second linearly extending surface, orthogonal to said first linearly extending surface, and shaped to a different chain link facing in a second orientation orthogonal to the first orientation, said first end of said first piece and said second end of said second piece forming a first end portion where said first and second pieces come together forming a first hole that extends through both of said first and second pieces, said second end of said first piece and said first end of said second piece forming a second end portion, at an opposite end to said first end portion, where said first and second pieces come together and forming a second hole that extends through both of said first and second pieces.

2. A cable sliding device, comprising:

first and second pieces, each made of structural material, said first piece and said second piece having identical shapes, and each having a first end and a second end, said first and second pieces fitting together at an inner surface location, where a first surface of said first piece presses against a second surface of said second piece, and where said first end of said first piece presses against said second end of said second piece, said inner surface location shaped to interlock the first and second pieces together, and where an area of the inner surface location forms inner surfaces forming a through hole of a first shape, said first end of said first piece and said second end of said second piece forming a first end portion where said first and second pieces come together forming a first hole that extends through both of said first and second pieces, said second end of said first piece and said first end of said second piece forming a second end portion, at an opposite end to said first end portion, where said first and second pieces come together and forming a second hole that extends through both of said first and second pieces, where said inner surface location which interlocks the first and second pieces together has multiple curved portions therein which press against each other when interlocked leaving no spaces therebetween other than the space of the inner surfaces forming the through hole, and where identically shaped multiple curved portions are on both said first piece and said second piece.

3. The device as in claim 2, further comprising a clamp, connected through said second hole on both said first and second pieces, holding said first and second pieces together.

4. The device as in claim 3, further comprising a removable connection, connected through said first hole on both said first and second pieces, holding said first and second pieces together, said removable connection pivotable relative to said first and second pieces and connected through said first hole.

5. The device as in claim 4, wherein said removable connection is a carabiner.

6. The device as in claim 2, further comprising a first fixed structural support attached to said first hole in said first and second piece, connected through said first hole in both said first and second piece, and said first fixed structural support being held between surfaces when connected between said first hole in said first piece and said second piece, and a movable support, connected to said second hole in said first and second piece, and pivotable relative to said second hole in said first and second piece.

7. The device as in claim 2, wherein said multiple curved portions include a convex portion and a concave portion on each of said first and second pieces.

* * * * *